Feb. 4, 1936. A. C. BUTTFIELD ET AL 2,029,984
BALING PRESS
Filed March 14, 1932    2 Sheets-Sheet 1
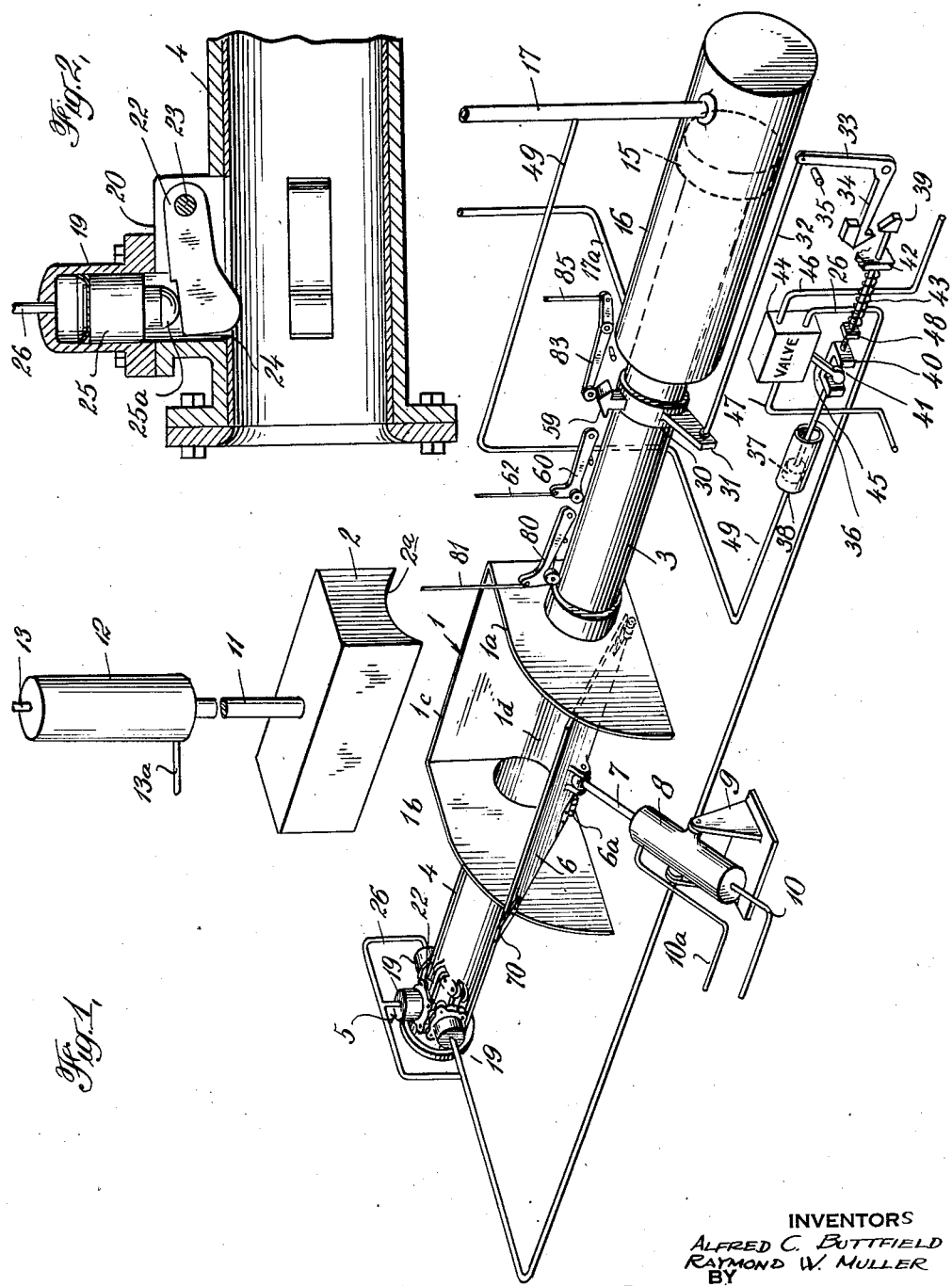
INVENTORS
ALFRED C. BUTTFIELD
RAYMOND W. MULLER
BY
ATTORNEYS

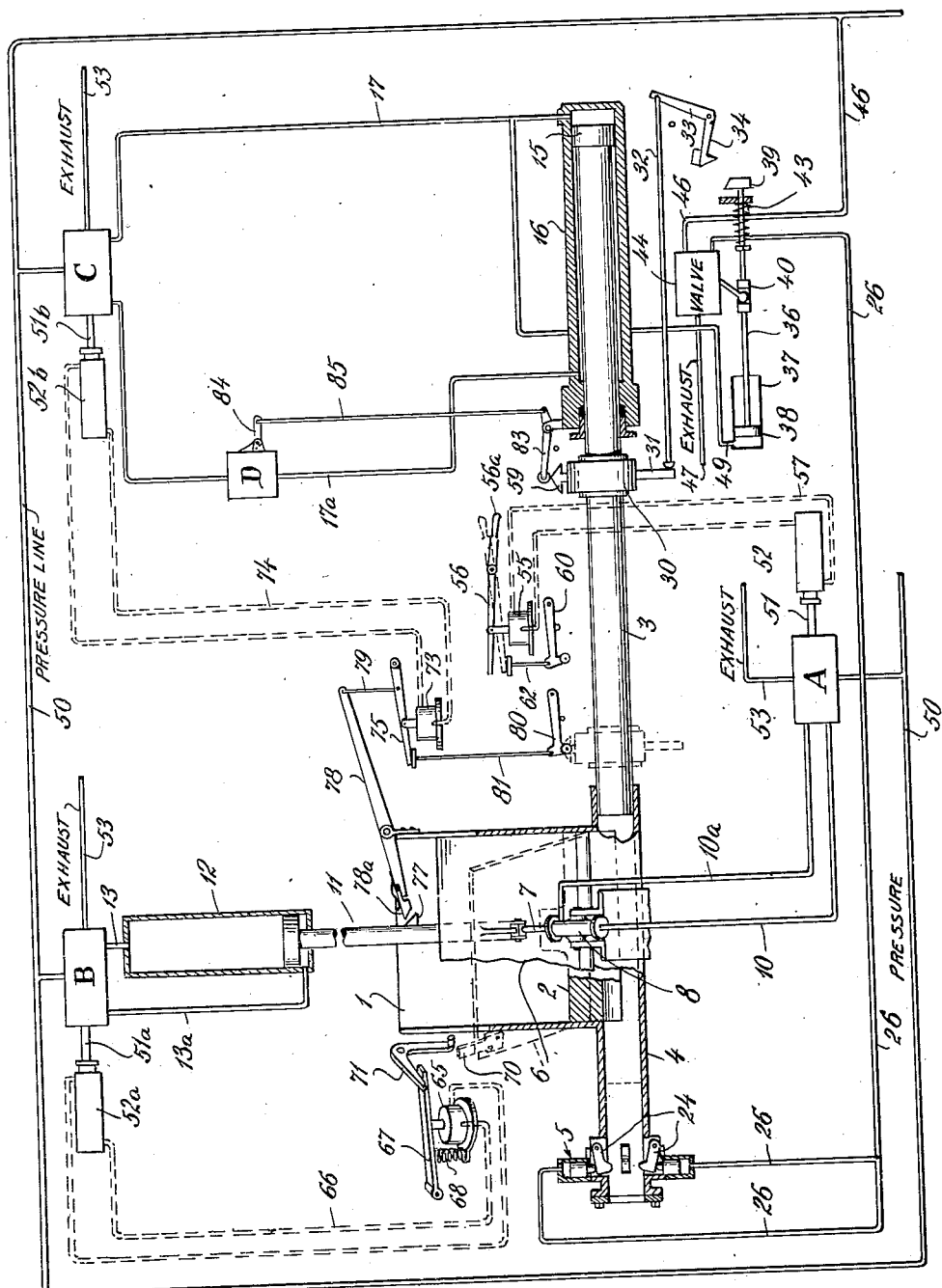

Patented Feb. 4, 1936

2,029,984

UNITED STATES PATENT OFFICE 2,029,984

BALING PRESS

Alfred C. Buttfield, North Plainfield, and Raymond W. Muller, Sewaren, N. J., assignors to The Vulcan Detinning Company, a corporation of New Jersey Application March 14, 1932, Serial No. 598,684

7 Claims. (Cl. 78—42)

This invention relates to baling presses, and especially to presses designed to compress loose material, such as metal strap, into bundles or bales to facilitate its handling or shipment. More particularly the invention relates to the type of baling press in which a charge of loose material is introduced into a receptacle and subjected to the powerful compressive action of a plunger operated, as for example, by hydraulic pressure to squeeze and deform the material into a compact mass.

One of the objects of the invention is the provision of control means for limiting the pressure applied to the material for the production of bales of definite and uniform density, and another is to avoid damage to the press as a result of the application of excessive pressure by the plunger. This control means is preferably responsive to the load upon the plunger and is adjustable to vary the degree of compression in accordance with the nature of the material being baled. Another object of the invention is to provide means for automatically ejecting a complete bale from the press upon each forward stroke of the plunger, thus obviating the delay incident to stopping the press for the removal of a bale.

These objects are attained in the preferred form of the invention by the provision of mechanism (referred to as a "gripping mechanism") for gripping, clamping or holding a previously formed bale within the discharge end of the receptacle (or, as designated herein, the compression chamber) to afford an abutment against which the constituent material of the succeeding bale is compressed during the working stroke of the plunger. According to the invention, the control means functions to release the gripping mechanism when the load upon the plunger attains a predetermined value or in other words, when the material being baled reaches a definite stage of compression. The control means becomes operative in advance of the end of the working stroke of the plunger so that the previously formed bale is pushed out of the compressed chamber by the final forward movement of the plunger, the succeeding bale at the same time being advanced to the position formerly occupied by the ejected bale. The gripping mechanism remains inactive until the plunger on its return stroke actuates the grippers to clamp the newly formed bale which now functions as the abutment against which the next charge of loose material is compressed.

The invention will be better understood from the following description of a preferred embodiment thereof, reference being had to the accompanying drawings in which—

Fig. 1 is a perspective view of a baling press embodying the features of the invention, nonessential structure being omitted;

Fig. 2 is a sectional view of one of the grippers for clamping a completed bale in the press; and Fig. 3 is a diagrammatic view of the baling press illustrating mechanism for operating the press.

The baling press shown in Fig. 1 comprises generally a bin 1 into which a charge of loose metal scrap is adapted to be introduced, a vertically reciprocable ram 2 slidable within the bin 1 to compress the charge in a vertical direction, a cylindrical plunger 3 reciprocable across the bottom of the bin 1 and in a direction at right angles to travel of the ram arranged to force the material within a compression chamber 4 disposed in axial alignment with the plunger upon the opposite side of the bin, and a gripping mechanism 5 for clamping a previously formed bale within the compression chamber.

The bin 1 is composed of two end walls 1a and 1b, a side wall 1c, an arcuately curved bottom 1d, and a door 6 constituting the other side wall of the bin. The door 6 is hinged at its bottom as at 6a and is connected adjacent its top to a piston 7 working in a cylinder 8, the cylinder being pivoted for rotation about a horizontal axis on a support 9. Liquid under pressure may be introduced into opposite ends of the cylinder 8 through the branch pipes 10 and 10a to operate the piston 7 to swing the door to an opened or closed position.

The ram 2 slides up and down within the open-ended bin 1 being operated by a piston 11 working in a cylinder 12 into which liquid under pressure is introduced through the branch pipes 13 and 13a. The bottom or operating face of the ram 2 is arcuately recessed as at 2a so as to form at the end of its down stroke in conjunction with the curved bottom 1d of the bin a cylindrical bore corresponding in diameter to that of the plunger 3.

One end of the plunger 3 is provided with a head 15 slidable within a cylinder 16, while the other end of the plunger is withdrawn through the end wall 1a a short distance beyond the interior of the bin 1 when the plunger is fully retracted. The cylinder is connected at its opposite ends with branch pipes 17 and 17a leading from a source of liquid pressure. When the branch 17 is placed in communication with the cylinder the pressure acting on the head 15 will move the plunger forward on its working stroke within the bore defined by the lower face 2a of the ram and the bottom of the bin 1d; and at the end of its working stroke the branch 17a being placed in communication with the cylinder will return the plunger to initial position.

The compression chamber 4 comprises a tubular member of very strong and durable construction and of substantially the same diameter as the plunger 3. The compression chamber is open at both ends, one end communicating with the bin through the wall 1b and forming a continuation of the bore defined by the bottom of the bin and the bottom of the ram, and its other end forming a discharge opening for the completed bales of material. The length of the compression chamber is such as to accommodate at least two bales, and near its discharge end it is provided with the gripping mechanism 5 for positively holding a previously formed bale to serve as a plug for the chamber against which a subsequent charge of material is compressed during its formation into a bale.

The gripping mechanism comprises a plurality of clamping units located at spaced intervals about the circumference of the compression chamber near its discharge end. Each clamping unit comprises a cylindrical housing 19 rigidly bolted to the compression chamber and provided with a recessed offset portion 20 as best shown in Fig. 2. A dog 22 is contained within the housing 19, one of its ends projecting into the recess of the offset portion and being pivoted upon a pin 23. The other end of the pin is capable of swinging through a slot 24 formed in the wall of the compression chamber. Slidable within the cylindrical housing 19 is a piston 25 carrying on its lower face a bearing member 25a adapted to contact with the free end of the dog and rock it through the slot 24 into clamping engagement with a bale disposed within the compression chamber. For forcing the piston downwardly the upper end of the housing is connected with a source of liquid pressure through the conduit 26. No special means for raising the piston is necessary since the ejectment of a bale from the compression chamber rocks the dog 22 upwardly and this in turn lifts the piston, expelling the liquid from the housing through the conduit 26 which at this time will be opened to exhaust.

The means for limiting the pressure exerted by the plunger 3 upon the material being compressed and the means for ejecting the clamped bale from the compression chamber will now be described.

The plunger 3 carries upon it a crosshead 30, it being understood that the bin 1 and crosshead 30 when the plunger 3 is fully retracted are separated by an interval corresponding at least to the travel of the plunger so as to permit unobstructed movement of the crosshead. Laterally projecting from the crosshead is a tappet 31 designed to strike near the termination of the return stroke of the plunger the end of a rod 32 slidably supported alongside the cylinder 16. The other end of this rod is pivotally connected to one arm of a bell-crank 33, the other arm of the bell-crank constituting a latch 34. The latch extends approximately horizontally and its weight tends to rock the arm 33 counter-clockwise against a stop 35 when the tappet is out of contact with the end of rod 32, the bell-crank being free for unrestricted movement in a clockwise direction as viewed in Fig. 1. Disposed below the rod 32 and extending parallel therewith is a shaft 36 to one end of which is connected a piston 37 working in a cylinder 38, and to the other end is fastened a lug 39. Intermediate the ends of the shaft is a block 40 having a notch 41 formed in one side face; and bearing against a nut 48 threadedly adjustable along the shaft and against a boss 42 formed upon the frame of the baling press is a coil compression spring 43, this spring tending to shift the shaft 36 to the left as viewed in Fig. 1 with the piston 37 completely telescoped within its operating cylinder 38. A three-way valve 44 is located adjacent the block 40 and is designed to be operated by a pivoted finger 45, one end of which fits within the notch 41 of the block and the other end being connected to means for operating the three-way valve. A three-way valve of conventional construction may be employed and a description of this valve is unnecessary beyond the statement that it serves to connect the conduit 26 leading to the gripping mechanism 5 either to a liquid pressure line 46 or to an exhaust line 47, depending upon the position occupied by the pivoted finger 45. The closed end of cylinder 38 through a lead-off line 49 communicates with branch pipe 17 leading into the closed end of cylinder 16.

One system for obtaining a cyclic operation of the baling press is diagrammatically illustrated in Fig. 3. A hydraulic line 50 leading from a suitable source of pressure communicates with three valves designated A, B and C in Fig. 3 of the drawings. These valves are identical and are of any conventional type, and they are arranged to be actuated pneumatically by a piston 51 working in a cylinder 52. Valve A controls the admission of liquid into the cylinder 8, through the two branches 13 and 13a to operate the piston 7, this valve also being connected to an exhaust line 53. Valve B admits pressure into the cylinder 12 through either one of the branches 13 or 13a, connecting the other branch to exhaust line 53. Valve C similarly controls the admission of pressure to one end of the cylinder 16, through either of the branches 17 or 17a, permitting the discharge of liquid from the other end of the cylinder into the exhaust line 53. To operate the piston 51 to throw valve A, there is provided a pneumatic control valve 55 provided with an intermediately pivoted operating lever 56 having a handle 56a, this control valve being interposed in a compressed air system 57 conventionally represented in broken lines. When the handle end of this lever is raised into the dotted line position shown in Fig. 3, the pneumatic valve admits compressed air to the cylinder 52 to shift the piston 51 in one direction. For restoring the control valve 55, and hence the piston 51, to its original position, upon the cross-head 30 of plunger 3 is provided a cam 59 which, at the end of the forward working stroke of the plunger, engages and lifts the free end of a pivoted arm 60 suspended in the path of travel of the cam. The free end of the arm 60 is connected to the lower end of a vertical link 62, the top of the link being arranged to strike the lower end of the pivoted operating lever 56 and kick the lever back to its full line position, thereby reversing the control valve 55. Reversal of the control valve shifts the piston 51 in cylinder 52 in the opposite direction. The cam 59 engages the pivoted arm 60 only momentarily and as soon as it has moved from beneath the arm on the return stroke of the plunger 3, the operating lever is again free to be manually rocked.

For governing the valve B there is provided control valve 65, similar to control valve 55, interposed in a compressed air system 66 represented by broken lines. In this control valve an intermediately pivoted operating lever 67 serves to regulate the admission of air to the cylinder 52a associated with valve B so as to shift the piston 51a. A spring 68 tends to hold one end of the operating lever depressed, in which position the valve B is influenced so as to admit liquid pressure to branch 13a to maintain the ram 2 raised. Upon the upper end of the door 6 of the bin 1 is carried a finger 70 which, when the door is closed, strikes one arm of a bell-crank 71 and rotates it to bring the other arm of the bell-crank into contact with the elevated end of the operating lever 67 and maintain it depressed against the action of the spring 68 while the door is closed. In this position piston 51a is shifted to actuate valve B to admit pressure to branch 13 thereby lowering ram 2. When the door 6 is opened again the operating lever 67 returns to its original position under the urge of spring 68.

A third control valve 73 is provided adjacent the bin 1, this valve being in all substantial respects a duplicate of control valve 55. This control valve is located in the compressed air system 74 and is actuated by an intermediately pivoted operating lever 75 whereby to admit air into the cylinder 52b, associated with the valve C, to shift piston 51b in either direction. The operating lever 75 is also designed to be actuated automatically. For accomplishing this there is provided on the piston 11 a projection 77 which when the ram 2 approaches its lowermost position is arranged to contact with one end of an intermediately pivoted arm 78 and rock this arm counter-clockwise. The other end of the arm 78 is connected by a link 79 to one end of the operating lever 75 so as to swing the latter to the position shown in Fig. 3 when the arm is rocked whereby the control valve 73, and in turn valve C, is actuated to cause pressure to be admitted to branch 17. For restoring the control valve to its original condition with the valve C transmitting pressure to cylinder 16 through branch 17a there is provided a pivoted arm 80 with one of its ends hanging in the path of travel of cam 59 on crosshead 30 of plunger 3. When the cam encounters the arm 80 the arm is elevated and with it is raised a vertically extending link 81, the lower end of which is fastened to arm 80 and its upper end disposed so as to strike the end of operating lever 75 which has previously been depressed, thus rocking the lever in the reverse direction. When the operating lever 75 is returned to its original position it follows that the pivoted arm 78, by reason of its connection to this lever through the link 79, will also be rotated in a clockwise direction to locate the free end of the arm once again in the path of the projection 77 on the piston 11. Since this will occur in advance of the return of the projection 77 to its raised position, the free end of the pivoted arm 78 is provided with a finger 78a yieldable in one direction against the action of a spring to permit the projection 77 to pass above it but unyieldable in its other direction except in unison with the pivoted arm 78. The arrangement is such therefore that the operating lever 78 is swung first in one direction by the link 79 attached to pivoted arm 78 and afterwards is swung in the opposite direction by the link 81 attached to pivoted arm 80.

In order that plunger 3 may come to rest at the end of its retracting stroke, a pivoted arm 83 having one end disposed in the path of travel of cam 59 on cross-head 30 is so located as to be engaged by the cam and rocked about its pivot. A valve D is inserted in the branch 17a and is arranged for operation by a bell-crank 84. A link 85 fastened at one end to the pivoted arm 83 and at its other to the bell-crank 84 closes valve D when the pivoted arm is elevated by the cam at the end of the return stroke of the plunger.

It will be understood that the scheme for attaining a cyclic operation of the baling press as above described while preferable is merely suggestive and that other means for actuating the ram 2, the plunger 3 and the door 6 of the bin may be employed. If desired, each of these movements may be independently performed in the absence of any coordination. In fact, as shown in Fig. 3, the operating levers 56, 67 and 75, the control valves associated with the valves A, B and C, respectively, are each capable of manual actuation.

The operation of the baling press is as follows: A quantity of material such as loose metal scrap, sufficient in amount to constitute a bale of predetermined size, is deposited in the bin 1. The operator then grasps the handle of operating lever 56 associated with air valve 55 and swings it into the dotted line position shown in Fig. 3, thus causing the valve A to be actuated as has heretofore been described, to admit liquid pressure into the cylinder 16 through branch 10 to close the door 6 of the bin, during which time liquid is expelled from the other end of the cylinder through the branch 10a which has been simultaneously opened to exhaust. Final closing movement of the door 6 causes the finger 70 to rock the bell-crank 71 to swing operating lever 67 of control valve 65 against the action of spring 68, thereby actuating valve B to admit pressure into the upper end of cylinder 12 through the branch 13 and expel liquid from the other end of the cylinder through branch 13a. This forces the ram 2 downward within the bin under powerful hydraulic pressure to crush the material into the bottom of the bin. As the ram slowly approaches its lowermost position the projection 77 on the piston 11 of the ram rubs against the end of pivoted arm 78 and tips it, and this through the link 79 rocks the operating lever 75 of control valve 73 to actuate valve C in such a manner that pressure is admitted to the cylinder 16 through the branch 17 to force the plunger 3 forward on its working stroke and liquid from the other end of the cylinder escapes through branch 17a.

The material which is being compressed into the bore between the arcuate working face of the ram and the arcuate bottom of the bin is swept by the plunger 3 into the compression chamber 4 and compressed against a previously formed bale which is being held by the gripping mechanism 5 within this chamber. During the working stroke of the plunger the load upon the plunger progressively increases as the density of the bale increases and the pressure in the branch 17, and hence in the lead-off 49 which is connected thereto and to the cylinder 38, finally buils up to such a value that the plunger 37 in cylinder 38 is shifted to the left against spring 43, causing the lug 39 to snap under the latch 34 of the bell-crank 33. Movement of piston 36 operates the three-way valve 44 through the pivoted arm 45 so as to open the conduit 27 to exhaust, which previously to this time will have been transmitting pressure to the gripping mechanism 5 to clamp the previously formed bale in the compression chamber. Pressure being relieved from the conduit 26, and hence from the dogs 22 in housing 19, further forward movement of the plunger 3 ejects the released bale from the end of the compression chamber and advances the newly formed bale into the position previously occupied by the discharged bale.

As soon as plunger 3 enters compression chamber 4 the lug 59 on cross-head 30 of the plunger 3 strikes the end of the pivoted arm 60 suspended in its path and similarly, just prior to completing its forward stroke, strikes arm 80 thus vertically raising the links 62 and 81, the upper ends of which contact with the operating levers 56 and 75 to rotate them clockwise. The arm 78 by the movement of operating lever 75 is in this way conditioned for operation by the projection 77 on piston 11 at the next downstroke of the ram. When the operating levers 56 and 75 are rotated the control valves 55 and 73 are operated, which in turn actuate valves A and C. Actuation of valve A admits pressure to the cylinder 8 through the branch 10a, opening the branch 10 to exhaust, so that the door 6 of the bin is swung open for the introduction of another charge of material. As the door swings open the finger 70 is disengaged from the bell-crank 71 and the spring 68 restores the operating lever 67 to its normal position. This operates the control valve 65 to throw valve B into such condition that pressure is admitted to cylinder 12 through branch 13a to raise the ram 2, branch 13 being simultaneously connected with exhaust. Similarly actuation of valve C admits pressure to the cylinder 16 through the branch 17a and opens branch 17 to exhaust so as to retract the plunger.

As the plunger approaches the end of its return stroke, the tappet 31 on cross-head 30 of the plunger encounters the end of rod 32 and shifts it longitudinally to rock bell-crank 33, thereby unlatching the lug 39 on shaft 36. Branch 17, and consequently lead-off 49, being at this stage connected to exhaust line 47, the coil spring 43 snaps the shaft 36 to the left, which action through the pivoted arm 46 causes the three-way valve 44 to connect the conduit 26 to the pressure line 46, pressure thus being communicated to the piston 25 in the cylindrical housing 19 to force the dogs 22 into gripping engagement with the newly formed bale, which bale now forms the abutment against which a succeeding charge of material will be compressed.

After the plunger has been fully retracted to its starting original position, the pivoted arm 83 is raised by the cam 59 on the plunger crosshead, which causes the link 85 to swing bellcrank 84 to close valve D in branch 17a, thus arresting the movement of the plunger. The arm 66 is so arranged as to slide off of the cam 59 practically simultaneously with the initiation of the forward stroke of the plunger so that the opening of the valve D is not unduly delayed.

When the density of the bales being formed is desired to be varied, as when the character of the material being compressed is changed, the tension in coil spring 43 may be increased or decreased by screwing the nut 48 along the shaft 36, thereby determining the maximum amount of compression to be exerted upon the material in the compression chamber.

It is to be understood that the gripping mechanism and control means for actuating the gripping mechanism above described is merely illustrative and that this mechanism may assume other forms without departing from the spirit of the present invention.

We claim:
1. A baling press comprising a bin adapted to receive a charge of loose material, a compression chamber having one of its ends in communication with the bin and its other end open, a ram reciprocable within the bin to compress the material in one direction, a plunger reciprocable within the bin in another direction to compress the material compactly within the compression chamber to form a bale, gripping means for holding a previously formed bale within the compression chamber to provide an abutment against which the loose material is compressed, means for actuating said gripping means, a latch for holding said gripping means against operation, and means operable in timed relation with respect to the plunger for tripping said latch to actuate said gripping means.

2. An apparatus for compressing loose material into a bale, the combination comprising a compression chamber having opened opposed ends and top, of a length substantially equal to two compressed bales, means for forcing loose material into the chamber through the open top and then closing such opening, a reciprocating plunger at one end of the chamber to force the material toward the other end, a dog at said other end projectable into the chamber for engaging and holding a previously formed bale, the bale adapted to act as the sole closure and abutment at said other end and means acting in timed relation with said plunger for retracting said dog, whereby when a new bale is compressed between said previously formed bale and plunger, the dog releases the previously formed bale, and the new bale, through further movement of said plunger, ejects the previously formed bale.

3. Apparatus for compressing loose material into a bale comprising a compression chamber, said chamber having an extension forming an outlet therefrom, a piston reciprocable within said compression chamber to compress a charge of loose material therein, means projectable into said extension, means for holding said projectable means in said extension to cause the projectable means to hold a compressed charge of material therein, whereby said compressed charge temporarily closes said compression chamber and forms an abutment against which said second charge is compressed, and means for releasing the holding means when said second charge has been compressed.

4. Apparatus for compressing loose material into a bale comprising a compression chamber, said chamber having an extension forming an outlet therefrom, a piston reciprocable within said compression chamber to compress a charge of loose material therein and to thereafter eject it through said extension, holding means, means operatively connected with said holding means for causing said holding means to move into the path of movement of a compressed charge temporarily to hold it in said extension after compression, whereby a compressed charge will act as an abutment against which a second charge may be compressed, and means for releasing said holding means after a second charge has been compressed, so that said first compressed charge may be ejected.

5. Apparatus for compressing loose material into a bale comprising a compression chamber, said chamber having an extension forming an outlet therefrom, a piston reciprocable within said compression chamber to compress a charge of loose material therein and to thereafter eject it through said extension, holding means, means operatively connected with said holding means and said piston for causing said holding means to move into the path of movement of a compressed charge and temporarily to hold it in said extension after compression, whereby a compressed charge will act as an abutment against which a second charge may be compressed, and means for releasing said holding means after a second charge has been compressed and for maintaining said holding means released for a length of time sufficient to permit the piston to eject said first compressed charge from said extension.

6. Apparatus for compressing loose material into a bale comprising a compression chamber, said chamber having an extension forming an outlet therefrom, a piston reciprocable within said compression chamber to compress a charge of loose material therein and to thereafter eject it through said extension, the stroke of said piston with respect to the length of the chamber being such that a single stroke thereof is insufficient to compress a charge of loose material and eject it from said extension, holding means, means operatively connected with said holding means for causing said holding means to move into the path of movement of a compressed charge and temporarily to hold it against ejection after compression, whereby a compressed charge will act as an abutment against which a second charge may be compressed, and means for releasing said holding means after a second charge has been compressed to the desired extent in said compression chamber.

7. Apparatus for compressing loose material into a bale comprising a compression chamber, said chamber having an extension forming an outlet therefrom, a piston reciprocable in said chamber to compress a charge of loose material therein and to thereafter eject it through said extension, a dog projectable through one wall of said extension, means operatively connected with said dog and the piston for actuating said dog to engage and hold a compressed charge of material in said extension, whereby said compressed charge forms an abutment against which a second charge of loose material may be compressed, said actuating means further acting when the piston reaches a predetermined position in the chamber on a subsequent compression stroke for releasing said holding means to permit ejection of the previously compressed charge from said extension.

ALFRED C. BUTTFIELD.
RAYMOND W. MULLER.